United States Patent
Huck et al.

(10) Patent No.: US 12,386,862 B2
(45) Date of Patent: Aug. 12, 2025

(54) METHOD AND ANALYSIS SYSTEM FOR TECHNICAL DEVICES

(71) Applicant: Siemens Aktiengesellschaft, Munich (DE)

(72) Inventors: Ralf Huck, Großkrotzenburg (DE); Walter Plesnik, Aachen (DE)

(73) Assignee: Siemens Aktiengesellschaft, Munich (DE)

( * ) Notice: Subject to any disclaimer, the term of this patent is extended or adjusted under 35 U.S.C. 154(b) by 225 days.

(21) Appl. No.: 18/014,598

(22) PCT Filed: Jul. 6, 2020

(86) PCT No.: PCT/EP2020/068969
§ 371 (c)(1),
(2) Date: Jan. 5, 2023

(87) PCT Pub. No.: WO2022/008028
PCT Pub. Date: Jan. 13, 2022

(65) Prior Publication Data
US 2023/0252050 A1    Aug. 10, 2023

(51) Int. Cl.
*G06F 16/28* (2019.01)
*G06F 21/62* (2013.01)
*G06N 3/08* (2023.01)

(52) U.S. Cl.
CPC ........ *G06F 16/285* (2019.01); *G06F 21/6218* (2013.01); *G06N 3/08* (2013.01)

(58) Field of Classification Search
CPC .... G06F 16/285; G06F 21/6218; G06F 16/28; G06N 3/08; G05B 19/042;
(Continued)

(56) References Cited

U.S. PATENT DOCUMENTS 12,117,821 B2 * 10/2024 Chakravarthy .... G05B 23/0235
2008/0100570 A1    5/2008 Friedrich et al.
(Continued)

FOREIGN PATENT DOCUMENTS

CN    103098022    5/2013
CN    105991765    10/2016
(Continued)

OTHER PUBLICATIONS

PCT International Search Report dated Feb. 12, 2021 based on PCT/EP2020/068969 filed Jul. 6, 2020.

*Primary Examiner* — Quazi Farooqui
(74) *Attorney, Agent, or Firm* — Cozen O'Connor (57) ABSTRACT

A system for processing data of a technical device of a technical system includes the technical device that detects measurement data within the technical system, a data storage device for storing measurement data and additional data relating to the technical device, a computing unit connected to the storage device that runs program code units that include a device interface unit that receives measurement data and additional characteristic data from the technical device and stores them in the data storage device, an analysis unit for providing selected analysis data for an operator of the system, wherein the selected analysis data is provided based on a unique identifier of technical device, a correlation of the measurement data and the characteristic data to the technical device, and preferably based on the access authorization of the operator, and a communication unit that visually provides the selected analysis data to the operator.

16 Claims, 2 Drawing Sheets (58) Field of Classification Search
CPC ........... G05B 2219/23009; G05B 2219/24071; G05B 2219/35494
See application file for complete search history.

(56) References Cited

U.S. PATENT DOCUMENTS

| | | |
|---|---|---|
| 2016/0274978 A1 | 9/2016 | Strohmenger et al. |
| 2017/0089258 A1* | 3/2017 | Ritter .................... F04D 27/001 |
| 2019/0023296 A1 | 1/2019 | Köhler et al. |
| 2020/0096962 A1 | 3/2020 | Augustin et al. |
| 2020/0103259 A1 | 4/2020 | Harding et al. |

FOREIGN PATENT DOCUMENTS

| | | |
|---|---|---|
| CN | 108475354 | 8/2018 |
| CN | 110678817 | 1/2020 |
| CN | 111190880 | 5/2020 |
| WO | 0052541 | 9/2000 |
| WO | 2020077732 | 4/2020 |

* cited by examiner

METHOD AND ANALYSIS SYSTEM FOR TECHNICAL DEVICES

CROSS-REFERENCE TO RELATED APPLICATIONS

This is a U.S. national stage of application No. PCT/EP2020/068969 filed 6 Jul. 2020.

BACKGROUND OF THE INVENTION

1. Field of the Invention

The invention relates to a system for processing of data of at least one technical device of a technical installation, a method for providing measurement data and additional characteristic data of the at least one technical device of the technical installation, a computer program executable by a computer, and to a storage device medium with the computer program.

2. Description of the Related Art

Industrial devices are, for example, sensors for measuring physical variables, such as pressure, temperature, and/or throughflow, actuators for pumping or for changing the position of a valve, activation devices, such as electrical drives, or communication devices, such as gateways or remote I/Os. What all devices have in common is that, in order to fulfill their function, sensor measurement data must be obtained. This can be sensor data from the customer-side process, such as pressure, temperature, throughflow, or sensor data from the device itself, such as the temperature of the electronics, the setting of a valve, the rotational speed of a motor, or the data rate of a gateway. For orderly operation of the devices it is necessary to operate these devices in accordance with a specification.

How this must happen in detail is described in the manufacturer's documentation belonging to the device. The requirements listed in the documentation absolutely must be adhered to in order to make possible a safe and specification-conformant operation of the devices. The duty of the operator of an installation is therefore to pay attention to the documentation as precisely as possible, because otherwise the desired function of the devices with their measurement results is not given.

The complete digital description of a device needed for this is also referred to as the "digital twin". The increasing number of provisions, standards and approvals means that there is a disproportionate amount of effort for administration, i.e., for example, for creating, archiving, and/or locating these documents. This involves all the device types, such as machines, controllers, tools, measurement devices, and/or actuators in equal measure.

The required documentation, in particular with safety-critical applications, with frequent version changes of the software or hardware of with applications with increased requirements for the conditions of use or for traceability requirements for the materials used along the added-value chain is especially comprehensive. In these cases, a generic documentation for the device type is often not sufficient, so that the measurement task of the device cannot be fulfilled. A device type is understood as being all devices of a specific device family, for example, "relative pressure sensors of the XY series".

Each individual device entity often needs its own version-specific or material-specific documentation. Here, the term "device entity" is understood as being precisely one device of a specific device type, such as a device with the serial number "NM" of the series "XY".

Examples of the documents needed are: commissioning, operation, repair and calibration guides, technical descriptions, approvals, materials certificates, delivery notes, and/or customs declarations.

A device can only fulfil its measurement function by complying with all the peripheral conditions described in the documentation. The distributor (manufacturer) is responsible here for the suitable provision of all documents assigned error-free to the device entity. This occurs, as a rule, by enclosing the documents with the device in printed form, on a data medium or via, if allowed by country-specific standards, a publication in the Internet.

This is associated with a significant logistical effort, because the documents are often selected for different internal (manufacturer) and external (supplier) databases and must be assigned to the correct device entity and the correct customer order for a specific measurement task. An error-free measurement function of the device is only given with correct assignment of the documentation.

The documents arise along the entire added-value chain consisting of development of the device. As a result, approval, suppliers, manufacturing and testing, as a rule a system-wide system, is not available, meaning that the documents predominantly must be assigned to the device manually with great effort. This manual activity moreover brings with it the danger of introducing errors.

The operator (customer of the device entity) must always have these documents to hand in order to be able to access them and pay attention to them during commissioning, measurement application or maintenance and repair of the devices, because only in this way is an error-free acquisition of the measurement values of the devices given. For this, the documents accompanying the delivery are to be suitably archived, so that they can be assigned to the correct entity later. What is problematic here is that distributor and operator often use different name spaces to identify the entity.

If a technical installation of the operator is to be planned and built by a third-party company, then the assignment problem is again increased because the name spaces of a number of companies must then be reconciled with one another. In this case, the documentation is also frequently administered manually and by handover of paper-based documentation.

Overall the logistical effort involved in this can only be handled by deploying ever more personnel. With a tightening of the standards situation, this problem will continue to increase.

It is known that, for orderly operation of devices, the following working steps, presented in a simplified manner, are to be performed:

Distributor:
  collecting the relevant documents from all suppliers,
  assigning the documents of the supplier to the order for a device and the respective entity,
  selecting the required own documents from different databases,
  assigning the own documents to the order for a device and the respective entity, and
  sending of all documents while retaining the correlation between documentation and device.

Device Operator:
  unpacking the devices and the associated documentation, archiving the documents and assignment to their own designation system, while retaining the correlation between entity of the device and documentation, and retrieving and selecting the documents of a specific entity of a device from the database of the operator, for commissioning, for example.

Operation or Service:
  manually assigning further documents arising in the life cycle of the device entity (for example repair orders, reports and calibration certificates) for the respective entity.

The delivery of a distributor, as a rule, consists of a number of device types and entities. This means that the logistical effort of document management is significant. The processes are therefore frequently semi-automated. Here, the manual processes are replaced by interfaces between database systems. Although this means that the manual effort is less, there is however additionally a significant outlay for maintenance of the IT interfaces between different databases and suppliers. Print-on-demand systems allow the provision of known documents to be simplified, because the digital documents available can be printed to accompany the order. By contrast, with the reduced manual outlay here for the physical provision, it is to be noted however that the interfaces to the database systems still must be maintained and that the printing costs can be higher.

On the side of the operator of a technical installation or the like, it is no longer possible to maintain an entity-based assignment of the documents. The documents are therefore frequently mixed-up during archiving or, if the documents can no longer be found, replaced by a type from earlier deliveries. Overall, the previously known system is very elaborate and prone to errors. Furthermore, no information about quality of the data is possible. Through this loss of correlation between document and device, it is only possible to continue to ensure an error-free operation and acquisition of the respective sensor data with great effort.

The problem of missing entity-based correlation between device and documentation at the operator is to be countered by digitization of the data handling and standardization efforts. Attempts are being made here to standardize metadata for documents, so that the manufacturer can hand over the documents in hierarchically structured machine-readable containers. Such standards, however, cannot avoid the disadvantages previously mentioned. The problems associated therewith are merely transferred from the operator to the distributor, who then, through the comprehensive requirements in the standard, has an even greater problem of entity-related, unique document assignment between device and documentation.

So-called document management systems can be used to manage documents in digital form. For this purpose, the market makes available a plurality of different systems with different functions. These systems can frequently be used to supplement documents with metadata to then be able to find them more easily later based on the metadata. Modern systems also possess the function of an automatic supplementation with metadata based on text recognition.

A significant difference from the invention described herein is, however, that document management systems involve island solutions, which do not establish any reference to real devices and their measurement data or diagnostic data and thus also do not represent any integrated, digital expansion of a device in the sense of a digital twin. The island solutions moreover relate only to one group of users, for example, manufacturer or device operator. They do not provide the opportunity to exchange documents between legally separated units.

Also disadvantageous is that the function of known document management systems can only be used for single-stage supplementations. This assignment is further prone to errors and not always one-to-one, which in turn leads to a high manual maintenance effort and corresponding reworking. These systems are therefore preferably used in office applications, in which the emphasis is on a rapid narrowing down of the search result. The final choice of the documents needed must then be made by the user choosing from a list of possible documents. The actual correlation between search result and device thus still remains to be realized manually with the corresponding manual effort and susceptibility to errors. An automatic retrieval of correlated documentation data on occurrence of errors of the measuring device is not possible.

SUMMARY OF THE INVENTION

It is an object of the invention is to provide a system and method that make it possible to obtain an error-free measurement operation of technical devices of a technical installation.

This and other objects and advantages are achieved in accordance with the invention by a system for processing of data of at least one technical device of a technical installation, methods for providing measurement data and additional characteristic data of the at least one technical device of the technical installation, a computer program with program code instructions executable by a computer and by a storage device medium with a computer program executable by a computer, where the system for processing data of the at least one technical device of the technical installation comprises at least one technical device that is configured to detect measurement data within the technical installation, a data storage device for storing measurement data and additional data that relates to the at least one technical device, a computing unit that has a connection to the storage device and that is configured to run program code units, where the program code units comprise a device interface unit that is configured to receive measurement data and additional characteristic data from the at least one technical device and to store it in the data storage device and an analysis unit for provision of selected analysis data for an operator of the system, where the data is provided based on a unique identification of the at least one technical device, a correlation of the measurement data and the characteristic data with the technical device and preferably based on access authorization of the operator. A communication unit which is configured to provide the selected analysis data to the operator, in particular in a visual manner, is also provided.

The inventive system is in a position, at any given point in time, to establish a correct correlation of the at least one technical device with the measurement data transmitted by the device and to establish additional characteristic data.

The additional characteristic features relate to the technical device of the technical installation and can, for example, be commissioning instructions, operating instructions, repair instructions or calibration instructions. Further examples are technical descriptions, approvals, material certificates, delivery notes or customs declarations.

A technical device can, for example, be a pump, a motor, a sensor, and/or a control device.

The inventive system brings with it a plurality of advantages. On the one hand, it is possible to dispense with a manual assignment and handling of documentation for suppliers, distributors, engineering, installation engineers and operators. Over and above this, it is possible to dispense with manual interfaces or interfaces that must initially be automated between different database systems, from which the documents for the documentation previously had to be retrieved. Through a suitable segmentation of the data storage and a classification of the data, a control of the access authorization is made possible, which complies with the legal rules for exchange of data between legally separate units is observed. A further advantage of the invention is an automatic and thus error-free assignment (mapping) of the documents. Moreover, a parallel access to the documentation is already possible as from the time of manufacturing of the device entity for engineering, installation engineering and operator.

The device interface unit can be configured to exchange characteristic data between legally separated business units (i.e., from different legal persons) and in such cases to take into account legal rules such as for example copyright, tax law, and/or export controls.

The objects and advantages are also achieved in accordance with the invention by a method for providing measurement data and additional characteristic data of at least one technical device of a technical installation, where the method comprises:

a) transmitting initially non-correlated measurement data and additional characteristic data from the at least one technical device of the technical installation to a data storage device, where the measurement data and the additional characteristic data are uniquely assignable to a specific device type and/or a specific device entity, a type of the measurement data and the additional characteristic data and preferably further metadata of the measurement data and the additional characteristic data;

b) storing a relationship structure between the at least one technical device and the measurement data and the additional characteristic data of the technical device in the data storage device, where the relationship structure comprises a correlation between the measurement data and the additional characteristic data belonging to the at least one technical device and the respective device types and/or device entities, types of the measurement data and the additional characteristic data, and preferably further metadata of the measurement data and the additional characteristic data and preferably additionally the access authorization and/or property rights of the measurement data and the additional characteristic data;

c) automatically filling the relationship structure of the measurement data and the additional characteristic data previously transferred to the data storage device via suitable assignments; and d) providing specific measurement data and additional characteristic data to an operator, where at least one assignment from the relationship structure between the at least one technical device and the measurement data and the additional characteristic data are taken into account.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE EXEMPLARY EMBODIMENTS

Figure 1:
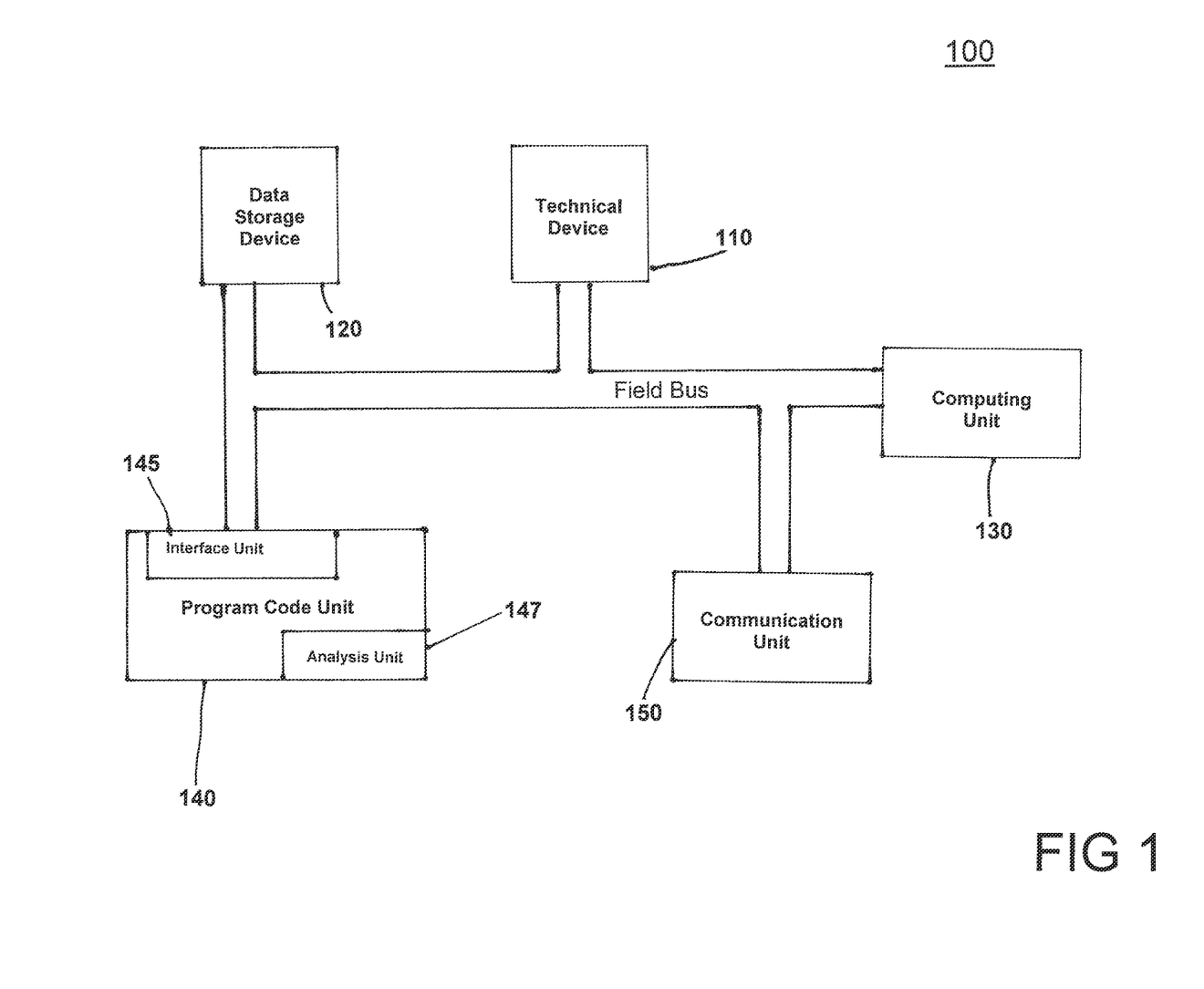
FIG. 1 is a schematic block diagram of a system for processing data of at least one technical device of a technical installation.

The system 100 comprises at least one technical device 110 that is configured to detect measurement data within the technical installation. A data storage device 120 for storing measurement data and additional data that relates to the at least one technical device is also provided. The system further includes a computing unit 130 that has a connection to the storage device and that is configured to run program code units 140.

In accordance with the invention, the program code units 140 comprise a device interface unit 145 that is configured to receive measurement data and additional characteristic data from the at least one technical device 110 and to store it in the data storage device 120 and an analysis unit 147 for provision of selected analysis data for an operator of the system, where the data is provided based on a unique identification of the at least one technical device, a correlation of the measurement data and the characteristic data with the technical device and preferably based on access authorization of the operator.

A communication unit 150 that is configured to provide the selected analysis data to the operator, in particular in a visual manner, is also provided.

Initially, the measurement data and the additional characteristic data are put into the data storage device unstructured. The data storage device can be part of a server, which is located in the industrial system (on-site) or outside the industrial installation (cloud-based).

Subsequently, the relationship structure is created in a raw form in the data storage device. This mapping description, initially unfilled or filled with placeholders, which describes the relationship between device entity and/or the device types, the documentation types needed in each case (for example, delivery note, invoice, type plate, data sheet, manual, approval certificate . . . ) as well as global property and access authorization, is filled via algorithms, which search the contents of new documentation data accepted into the storage device according to defined rules or semantic recognition patterns. The ideally one-to-one assignment of the technical devices to the measurement data and additional characteristic data in the relationship structure is derived from the result.

The measurement data and additional characteristic data belonging in accordance with the relationship structure to a specific device type and/or a specific device entity are finally made available to a user, preferably depending on their access authorization and/or property rights. The provision according to property rights can also be undertaken via previous separation of the data into separate data storages protected by access authorization.

The method described here thus looks at measurement values and documentation needed for their correct acquisition in a comprehensive systemic approach. By contrast, with the long known, predominantly manual provision and linkage of measurement data and additional characteristic data from different data storages in a plurality of databases structured as islands without automated reference to the measurement values, the inventive method is based on a single, manufacturer-independent, easily parameterizable system, which is filled in parallel by all suppliers and originators and used by engineering, installation engineering and operators of the measurement devices.

The advantages produced by this are as follows:
- Removal of the manual assignment and handling of the documentation data for devices for suppliers, originators, engineering, installation installers and operators.
- Removal of the manual interfaces or interfaces to be automated between the different data storage systems from which the documents for the documentation data previously had to be retrieved.
- Automatic and thus error-free assignment (mapping) of the documents (in the previously known methods new errors could be produced with each manual assignment).
- No need for renewed creation of the correlation between measuring device and associated documentation with archiving, saving and distribution of the documentation data at each operator
- The data (documentation) correlated with the devices is only stored once and is provided globally as a service.
- Parallel access to the documentation data correlated with the device throughout the entire life cycle. For example, for the correct design of the measurement point right from the manufacturing of the device entities for engineering, installation engineering and operator (instead of previously sequentially along the value-added chain), during commissioning of the device for error-free installation and parameterization, for service tasks such as for device calibration.
- Removal of the physical provision of the documents between distributor of the sensors and the user of the sensors.
- Multi-user capable, i.e., documentation data can be used/retrieved globally by any given users simultaneously.

Preferably, specific measurement data and additional characteristic data are also provided to the operator, where data is exchanged between legally separated units while complying with the legal rules relevant for this.

Achievement of the objective is improved even further by an expansion of the assignment rules by machine-readable rules (able to be maintained by the distributor) for parameterization of the analysis unit for the one-to-one automatic recognition of correct assignment rules für each structure element of the relationship structure or assignment rule.

The search results of the assignment rules can be assessed so that hit probabilities can be derived from the ranking. Here, known or manually assigned assignments, assignments derived from rules, search results from areas specifically identified as correct and quality of the match with search terms are used and assigned specific hit probabilities (ranking and selectivity). This enables the number of the search results to be reduced to one where possible in order to establish an advantageous one-to-one nature of the assignment.

With features that advantageously exist described below the method can be expanded during the life cycle of a technical installation with devices and the quality of the assignment rule can be checked and improved.

The access authorization of a user can be restricted in accordance with property rights and where necessary export provisions.

The relationship structure can, for example, have an expanded designation (for example, country, site, installation name, geo data). In addition, further documentation data can be integrated into the relationship structure (for example, photo of type plate, photo of installation site, repair orders, reports, calibration certificate . . . ), which arise during the course of a device life cycle at the operator and can be used by him in the same way. This expanded documentation data is likewise required for the error-free operation of the measurement point. In this way, for example, calibration intervals not adhered to, repairs incorrectly performed or simply just incorrectly assigned documentation or mistaken devices can lead to the measurement values of the devices no longer corresponding with the expected specification. Thus, the expanded documentation data also represents an important prerequisite for the correct measurement result.

The documentation data classified into the relationship structure preferably has a hierarchical or ontological structuring. This allows navigation through the structure to be simplified for the user.

The relationship structure can be expanded manually in order to be able to define or correct parameters of the structure manually.

Moreover, an option can be provided to "lock in" the assignment rules so that these cannot be corrupted either by the system itself or by manual changes.

Methods can be provided for automatic division of documents into a number of document parts, so that the document parts can be uniquely assigned to a relationship structure. This function can support the provision of text sections as needed. Thus, for example, a device may not be put into maintenance mode while the process installation is still in operation. Thus, only the correlated text sections may be displayed that match the respective life cycle of the installation and make sure that error-free measurement data is maintained.

Methods for recursive recognition and identification of specific elements by the manufacturer or operator can be used, which make possible a preventive obsolescence management. This function is needed for the temporal maintenance of the correlated measurement data.

Methods for recursive recognition and identification of elements by the manufacturer or operator can be used which make possible an improved state of repair.

Methods for recursive recognition and identification of elements by the manufacturer or operator can be used which make possible an improved selection of devices for new installations.

Export interfaces to engineering or service tools for automatic and structured provision of the documentation data to other systems can be present.

Import interfaces for automatic acceptance of new documents from the originators or from existing engineering or service tools can be present.

A function for comparison of the automatically and manually established assignment rule for error recognition and optimization of the algorithm for automatic filling of the relationship structure can be used. The semantic recognition is compared in the event of an error with the manual reworking and thereby becomes capable of learning.

The advantageous embodiments of the invention enable the following advantages to be obtained:

Maintenance of the system consisting of devices and documentation through simple parameterization without adaptation of the software.

Integrated rights management and or segmentation of the data storage, i.e., unauthorized persons are automatically excluded.

Transfer of the system into the name space of the devices of the operator.

Removal of the manual device assignment and handling of the documentation data during the course of the life cycle of the devices for the operator.

Manual error correction by all users with access authorization of the devices and data. Through this a far better error recognition rate arises. In the classic method, the assignment is only based on a one-off, manual definition by the distributor.

Automatic supervision of the data quality by comparison.

Easier navigation through better structuring.

Uniqueness of the assignment of shared documents by mapping parameters. This produces an enhanced possibility of context-sensitive documentation. According to their role, the user is only shown the documents that they need at the time according to their current task.

Support for obsolescence management, upkeep and device selection.

If a one-to-one assignment to device and measurement value cannot be realized, then a number of assignment options are provided with a ranking, where the ranking is derived from the similarity of the search results. Matching words are all the more similar, the more the sequence and the number of letters match. Sequences of words are all the more similar the fewer punctuation marks separate the word sequence from one another. The similarity of the word sequence is regarded as subordinate in ranking (lower ranking) to the similarity of the words, in order in this way to make possible a combined ranking consisting of words and word sequences.

The documentation data belonging in accordance with the relationship structure to a specific device type and/or a specific device entity is established by suitable assignment rules. These are described using examples below: a document of the type manual is to be assigned to a device type. For this, the contents of all documents are searched for one or more words that could indicate the type manual and the document is identified with the assignment manual. This can be undertaken, for example, with the aid of appended XML files. The data storage contains a number of documents of the type manual. Accordingly, further refinements must be made. All documents are searched for the words "device type" and identified accordingly. From the combination of manual and device type the document manual can now be assigned the device type. The assignment is one-stage here, because only contents from one document are needed in order to create the assignment rule (note: this is the prior art).

The restriction of the type to manual can lead to ambiguities, because the word "manual" in the document does not necessarily have to describe the document type but can also only occur in the text as a reference, such as "please refer to the manual" of another document for example of the type "material certificate". In this case, the assignment of this document of the type material certificate to the type manual would be incorrect. In order to avoid this, machine-readable auxiliary data (for example, via XML files) is proposed, which can limit the search result to specific manufacturers. This auxiliary data could, for example, describe location expected for a correct search result, because the word "manual" usually occurs on the first page of the document. Other examples for identification features can be: "word lies between line x and line y", "word has font size z", "word is printed in bold type". Through logical AND/OR relationships between the machine-readable rules the search result can be narrowed down even further, until a unique search result is reached. Via the OR relationship other languages or spellings can be included and correctly assigned, for example: "Manual" or "Handbuch" or "Instruction manual". Further refinements can be achieved using "If This Then That" relationships, in order, for example, to react to different rules for different manufacturers or at different times of the same manufacturer. From these rules given only by way of example, it is evident how the search result can be enhanced by machine-readable rules, so that in a surprising way a one-to-one search result is achieved.

An even more complex example could appear as follows: a document of type manual is to be assigned to a device entity. The assignments are begun as described above. The assignment to the device entity is however not possible because the document of type manual frequently does not contain any information about the associated entity. It is therefore proposed that the data storage be supplemented with further auxiliary data and that this be used for the one-to-one nature of the assignment rules. The auxiliary document is needed in this case not for the research result but only for the assignment rule.

In this example, the auxiliary document would be a simple table with device entities and associated device types. With this additional information, an assignment rule: entity has type, type has manual, manual has type, is then possible, so that the entity can be assigned to the manual on a one-to-one basis. (Note: from this perspective of the inventors, this is not the prior art). In a quite similar way, for example, the access rules can also optionally be regulated. For this an auxiliary document is set up that established the relationship between customer and entities purchased (for example the delivery note). Thus, the assignment rule is produced: entity has type, type has manual, manual has type, customer has entity (and may therefore see the documents that are assigned to the entity).

Because of the plurality of documentations produced with different layout and semantics a rule-based generation of correlations between devices and documentation can become complex and hard to understand. It is therefore proposed to supplement the rule-based correlation creation by artificial intelligence methods, in the form of a neural network or where necessary also to create the relationships purely on the basis of AI. Here, the "rules" needed for the AI are learned with the aid of data for devices correctly assigned previously. With the relationship knowledge learned in this way, new devices and data added to the system are likewise correctly correlated.

As already shown using the example of missing information for device entities in documents, where necessary multi-stage mechanisms are needed for setting up the correlations. In order to establish a unique reference between device and a specific item of associated documentation (e.g., a manual) unique identifications are needed for devices and documentation, which can be mapped (correlated) by machine. It should be noted here that the operator and manufacturer used different name spaces as a rule. The task thus consists initially of transferring these name spaces into one another, so that each user of the system can adjust the data of the device as required or can have it displayed to them.

In an advantageous embodiment of the invention, two subsystems are implemented. The first subsystem creates the required metadata, as seen by the manufacturer, as described in the above method for structured provision of correlated documentation data for devices of the documentation. This can, for example, consist of the manufacturer and their unique serial number. What is achieved by linking the manufacturer and serial number is that there cannot be any confusion with random identical serial numbers of another manufacturer. The second subsystem is to be found on the installation of the operator. The second subsystem has access to the metadata of the devices with which the documents are to be linked.

Here, a field bus system can be involved, for example, with which the measurement data of the devices for which the documentation is relevant is also transmitted. As an alternative, the metadata of the devices can also be acquired manually via its type plate or any QR code that might be present. Via the second subsystem, the metadata belonging to the name space of the operator (for example, of the device tag) (for example, manufacturer and serial number) can be read out by machine from the device (or read off manually). Now the assignments "device tag has manufacturer and serial number" (from the second subsystem); "manufacturer and serial number has documentation of type manual" (from the first subsystem) are automatically brought into a relationship with one another.

The manual belonging to a specific device tag is uniquely found and correctly assigned. Thus, it is now possible in a surprisingly simple way on occurrence of an incorrect measurement value (device delivers an error status via its field bus) to have the associated explanations from the manual displayed, without the explanations having to be added to the system beforehand manually or added in the form of specific device drivers. The assignment is made purely in a rule-based manner or on the basis of artificial intelligence with the aid of the documentation provided in unstructured form via the first subsystem.

Overall it is evident how, by supplementing the documentation data with auxiliary data in the form of machine-readable rules and in the form of auxiliary documents, in a surprising way a one-to-one search result for the relationship between measurement devices and their associated documentation data is achieved.

It is further evident how, by a legal linkage of subsystems of legally separate units of for example distributor and user, the search result can be derived for the first time from the information needed for it. With the aid of this one-to-one search result and by paying attention to the specifications given in the documentation of the distributor, an error-free operation of the corresponding devices at the user with correct measurement values can then be ensured.

Figure 2:
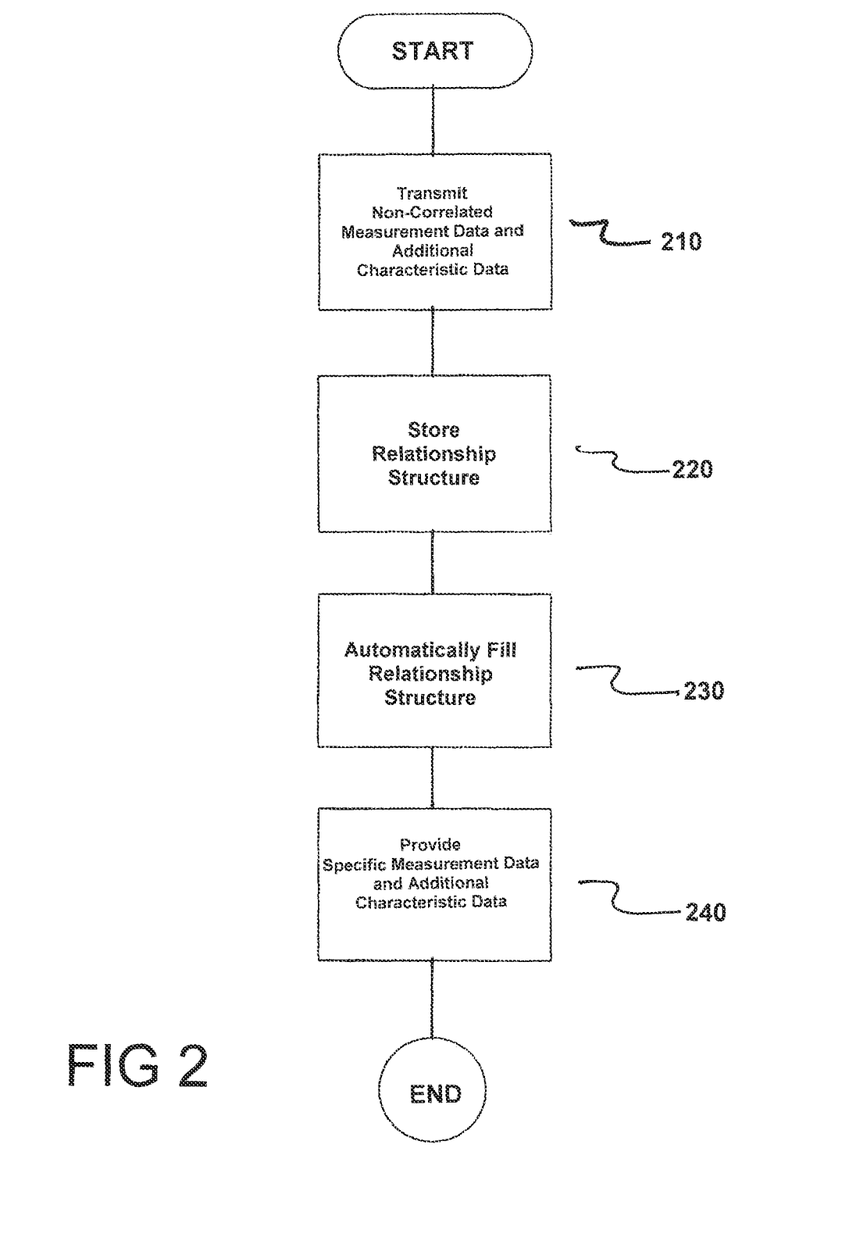
FIG. 2 is a flowchart of the method in accordance with the invention.

FIG. 2 is a flowchart of the method for providing measurement data and additional characteristic data of at least one technical device of a technical installation.

The method comprises a) transmitting initially non-correlated measurement data and additional characteristic data from the at least one technical device of the technical installation to a data storage device, as indicated in step 210. In accordance with the invention, the measurement data and the additional characteristic data are uniquely assignable to (i) at least one of a specific device type and a specific device entity, (ii) a type of the measurement data and the additional characteristic data and (ii) further metadata of the measurement data and the additional characteristic data.

Next, b) a relationship structure between the at least one technical device and the measurement data and the additional characteristic data of the technical device is stored in the data storage device, as indicated in step 220. Here, the relationship structure comprises a correlation between the measurement data and the additional characteristic data belonging to the at least one technical device and at least one of (i) respective device types and device entities, (ii) types of the measurement data and the additional characteristic data, and (iii) further metadata of the measurement data and the additional characteristic data, (iv) the access authorization and (v) property rights of the measurement data and the additional characteristic data.

Next, c) the relationship structure of the measurement data and the additional characteristic data previously transferred to the data storage device is automatically filled via suitable assignments, as indicated in step 230.

Next, d) specific measurement data and additional characteristic data are provided to an operator, as indicated in step 240. Here, at least one assignment consisting of the relationship structure between the at least one technical device and the measurement data and the additional characteristic data are taken into account.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A system for processing data of at least one technical device of a technical installation, the system comprising:
   at least one technical device which detects measurement data within the technical installation;
   a data storage device for storing measurement data and additional data relating to the at least one technical device;
   a computer connected to the storage device and configured to run program code, the program code comprising:
      a device interface configured to receive measurement data and additional characteristic data from the at least one technical device and to store said received measurement data and additional characteristic data in the data storage device; and
      an analyzer for providing selected analysis data for an operator of the system, the data being provided based on a unique identification of the at least one technical device, a correlation of the measurement data and the characteristic data with the technical device and based on access authorization of the operator; and
   communication circuitry which is configured to visually provide the selected analysis data to the operator;
   wherein the system is configured to:
   a) transmit initially non-correlated measurement data and the additional characteristic data from the at least one technical device of the technical installation to the data storage device, the measurement data and the additional characteristic data being uniquely assignable to at least one of (i) a specific device type and a specific device entity, (ii) a type of the measurement data and the additional characteristic data and (ii) further metadata of the measurement data and the additional characteristic data;

b) store a relationship structure between the at least one technical device and the measurement data and the additional characteristic data of the at least one technical device in the data storage device, the relationship structure comprising a correlation between the measurement data and the additional characteristic data belonging to the at least one technical device and at least one of (i) respective device types and device entities, (ii) types of the measurement data and the additional characteristic data, and (iii) further metadata of the measurement data and the additional characteristic data, (iv) the access authorization and (v) property rights of the measurement data and the additional characteristic data;

c) automatically fill the relationship structure of the measurement data and the additional characteristic data previously transferred to the data storage device via suitable assignments; and d) provide specific measurement data and the additional characteristic data to the operator, at least one assignment consisting of the relationship structure between the at least one technical device and the measurement data and the additional characteristic data being taken into account.

2. A method for providing measurement data and additional characteristic data of at least one technical device of a technical installation, the method comprising:

a) transmitting initially non-correlated measurement data and additional characteristic data from the at least one technical device of the technical installation to a data storage device, the measurement data and the additional characteristic data being uniquely assignable to at least one of (i) a specific device type and a specific device entity, (ii) a type of the measurement data and the additional characteristic data and (ii) further metadata of the measurement data and the additional characteristic data;

b) storing a relationship structure between the at least one technical device and the measurement data and the additional characteristic data of the technical device in the data storage device, the relationship structure comprising a correlation between the measurement data and the additional characteristic data belonging to the at least one technical device and at least one of (i) respective device types and device entities, (ii) types of the measurement data and the additional characteristic data, and (iii) further metadata of the measurement data and the additional characteristic data, (iv) the access authorization and (v) property rights of the measurement data and the additional characteristic data;

c) automatically filling the relationship structure of the measurement data and the additional characteristic data previously transferred to the data storage device via suitable assignments; and d) providing specific measurement data and additional characteristic data to an operator, at least one assignment consisting of the relationship structure between the at least one technical device and the measurement data and the additional characteristic data being taken into account.

3. The method as claimed in claim 2, wherein, for the providing specific measurement data and the additional characteristic data, the operator is provided with a plurality of measurement data and additional characteristic data, from which the user can perform a selection.

4. The method as claimed in claim 3, wherein the measurement data and additional characteristic data classified in the relationship structure has at least one of a hierarchical and ontological structuring.

5. The method as claimed in claim 2, wherein the measurement data and additional characteristic data classified in the relationship structure has at least one of a hierarchical and ontological structuring.

6. The method as claimed in claim 2, wherein a unique assignment rule of the measurement data and the additional characteristic data to device types of the device entities is created or supported by machine-readable rules based on at least one of (i) the measurement data and the additional characteristic data and (ii) the auxiliary data.

7. The method as claimed in claim 2, wherein machine-readable features are created for the measurement data and the additional characteristic data and an assessment and generation of the assignment rule derived from a measure of similarity is implemented.

8. The method as claimed in claim 7, wherein a measure of similarity is formed by artificial intelligence methods comprising a neural network and is learned via training data with already known assignment rules.

9. The method as claimed in claim 2, wherein the measurement data and the additional characteristic data are broken down into data sections and the data sections are assigned to the relationship structure via suitable assignment rules.

10. A method for providing measurement data and additional characteristic data of technical devices of a technical installation, the method comprising:

producing and providing technical devices and associated measurement data and additional characteristic data by different manufacturers; and utilizing the data being at least one user via a system for processing data of at least one technical device of a technical installation, the system comprising:

at least one technical device which detects measurement data within the technical installation;

a data storage device for storing measurement data and additional data relating to the at least one technical device;

a computer connected to the storage device and configured to run program code, the program code comprising:

a device interface unit which is configured to receive measurement data and additional characteristic data from the at least one technical device and to store said received measurement data and additional characteristic data in the data storage device; and an analyzer for providing selected analysis data for an operator of the system, the data being provided based on a unique identification of the at least one technical device, a correlation of the measurement data and the characteristic data with the technical device and based on access authorization of the operator; and communication circuitry unit which is configured to visually provide the selected analysis data to the operator;

wherein the measurement data and the additional characteristic data are related to one another via assignment rules derived from the respective measurement data and the additional characteristic data and further auxiliary data.

11. The method as claimed in claim 10, wherein a new assignment in the relationship structure between the at least one technical device and the measurement data and the additional characteristic data is performed in a second subsystem aided by the data provided by the technical device.

12. The method as claimed in claim 11, wherein the assignments generated with the aid of the measurement data and the additional characteristic data are utilized to indicate the correlated measurement data and the additional characteristic data.

13. The method as claimed in claim 12, wherein the correlated measurement data and the additional characteristic data are indicated as a function of further data of the at least one technical device.

14. The method as claimed in claim 13, wherein the characteristic data of the manufacturer and the at least one user is stored in separate segments of the system; wherein a segment is assigned to each manufacturer and user, via which a controlled, selective access to selected characteristic data of their own segment is definable for at least one user.

15. The method as claimed in claim 14, wherein the measurement data and the correlated characteristic data are indicated in compliance with the selective access authorization granted.

16. A non-transitory computer readable storage device medium encoded with a computer program which, when executed by a processor of a computer, causes provision of measurement data and additional characteristic data of at least one technical device of a technical installation, the computer program comprising:

a) program code for transmitting initially non-correlated measurement data and additional characteristic data from the at least one technical device of the technical installation to a data storage device, the measurement data and the additional characteristic data being uniquely assignable to at least one of (i) a specific device type and a specific device entity, (ii) a type of the measurement data and the additional characteristic data and (iii) further metadata of the measurement data and the additional characteristic data;

b) program code for storing a relationship structure between the at least one technical device and the measurement data and the additional characteristic data of the technical device in the data storage device, the relationship structure comprising a correlation between the measurement data and the additional characteristic data belonging to the at least one technical device and at least one of (i) respective device types and device entities, (ii) types of the measurement data and the additional characteristic data, and (iii) further metadata of the measurement data and the additional characteristic data, (iv) the access authorization and (v) property rights of the measurement data and the additional characteristic data;

c) program code for automatically filling the relationship structure of the measurement data and the additional characteristic data previously transferred to the data storage device via suitable assignments; and d) program code for providing specific measurement data and additional characteristic data to an operator, at least one assignment consisting of the relationship structure between the at least one technical device and the measurement data and the additional characteristic data being taken into account.

* * * * *